US008333113B2

(12) United States Patent
Classen et al.

(10) Patent No.: US 8,333,113 B2
(45) Date of Patent: Dec. 18, 2012

(54) TRIAXIAL ACCELERATION SENSOR

(75) Inventors: Johannes Classen, Reutlingen (DE); Lars Tebje, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 663 days.

(21) Appl. No.: 12/505,116

(22) Filed: Jul. 17, 2009

(65) Prior Publication Data

US 2010/0024554 A1  Feb. 4, 2010

(30) Foreign Application Priority Data

Jul. 30, 2008 (DE) .................. 10 2008 040 855

(51) Int. Cl.
*G01P 15/125* (2006.01)

(52) U.S. Cl. ..................... 73/514.32; 73/510; 73/514.38

(58) Field of Classification Search ............... 73/514.32, 73/514.36, 514.38, 514.29, 514.16, 510, 73/511

See application file for complete search history.

(56) References Cited

U.S. PATENT DOCUMENTS

| | | | | |
|---|---|---|---|---|
| 6,845,670 B1 * | 1/2005 | McNeil et al. | ............. | 73/514.32 |
| 6,955,086 B2 * | 10/2005 | Yoshikawa et al. | ........ | 73/514.32 |
| 6,981,416 B2 * | 1/2006 | Chen et al. | ..................... | 73/510 |
| 7,007,550 B2 * | 3/2006 | Sakai et al. | ................ | 73/514.29 |
| 7,150,250 B2 * | 12/2006 | Kuo et al. | .................. | 123/90.15 |
| 7,210,351 B2 * | 5/2007 | Lo et al. | ..................... | 73/514.32 |
| 7,258,012 B2 * | 8/2007 | Xie | ............................ | 73/514.32 |
| 7,426,863 B2 * | 9/2008 | Kuisma | ...................... | 73/514.32 |
| 7,487,661 B2 * | 2/2009 | Ueda et al. | ..................... | 73/1.39 |
| 7,690,255 B2 * | 4/2010 | Gogoi et al. | ............... | 73/514.32 |
| 7,886,601 B2 * | 2/2011 | Merassi et al. | ............. | 73/514.32 |
| 8,020,443 B2 * | 9/2011 | Lin et al. | ................... | 73/514.32 |
| 8,047,075 B2 * | 11/2011 | Nasiri et al. | ............... | 73/514.32 |
| 2007/0220973 A1 | 9/2007 | Acar | | |

* cited by examiner

*Primary Examiner* — Helen C. Kwok
(74) *Attorney, Agent, or Firm* — Kenyon & Kenyon LLP

(57) ABSTRACT

An acceleration sensor includes a substrate and a first mass element, which is connected to the substrate in such a way that the first mass element is rotatable about an axis, the first mass element being connected to a second mass element in such a way that the second mass element is movable along a first direction parallel to the axis, and the first mass element being connected to a third mass element in such a way that the third mass element is movable along a second direction perpendicular to the axis.

10 Claims, 2 Drawing Sheets

TRIAXIAL ACCELERATION SENSOR

FIELD OF THE INVENTION

The present invention relates to an acceleration sensor having a mass situated over a plane of a substrate.

BACKGROUND INFORMATION

Triaxial acceleration sensors, in particular triaxial micromechanical acceleration sensors, are needed for applications in entertainment and automotive electronics. A maximally compact design of the acceleration sensors is desired in those cases.

The basic principle of micromechanical acceleration sensors is that a seismic mass is movably supported with respect to stationary electrodes on a substrate with the aid of a suspension. The seismic mass and the stationary electrodes form one or more capacitors. A deflection of the seismic mass caused by an acceleration acting on the micromechanical acceleration sensor results in a change in the capacitances of these capacitors, which may be detected and represents a measure of the magnitude of the effective acceleration. To avoid zero deviations, capacitance changes are preferably evaluated differentially.

In the related art, triaxial acceleration sensors are implemented using three sensor cores which are independent of each other and have separate seismic masses, which are situated next to each other on a shared chip. This results in large space requirements and comparatively large acceleration sensors.

SUMMARY OF THE INVENTION

According to the present invention, an acceleration sensor includes a substrate and a first mass element, which is connected to the substrate in such a way that the first mass element is rotatable about an axis, the first mass element being connected to a second mass element in such a way that the second mass element is movable along a first direction parallel to the axis, and the first mass element being connected to a third mass element in such a way that the third mass element is movable along a second direction perpendicular to the axis. This acceleration sensor may be advantageously designed to be extremely compact.

The first mass element is preferably designed asymmetrically with respect to the axis. An acceleration acting perpendicularly to the substrate's plane thus causes the mass element to tilt about the axis, which improves its detectability.

In a preferred specific embodiment of the acceleration sensor, the substrate is a silicon substrate. A method compatible with conventional silicon processing may thus be used for manufacturing the acceleration sensor.

One embodiment of the acceleration sensor provides that at least one detection electrode, which is fixedly connected to the substrate and allows a rotation of the first mass element about the axis to be detected, is situated opposite to the first mass element. In a refinement of this specific embodiment, at least two detection electrodes are provided, the detection electrodes allowing a differential evaluation of a rotation of the first mass element about the axis. Zero deviations of the acceleration sensor may be suppressed due to the differential evaluation.

A detection electrode is preferably provided on each side of the axis, both detection electrodes being designed to be symmetrical to each other with respect to the axis. This symmetry provides advantages regarding the linearity and offset stability of the acceleration sensor.

In one embodiment of the acceleration sensor, the first mass element has a frame, the second mass element being connected to the frame via at least one bending spring which is extensible in the first direction. In another embodiment, the third mass element is connected to the frame via at least one bending spring which is extensible in the second direction. These embodiments make a very compact design of the acceleration sensor possible.

In a preferred specific embodiment, the second mass element has first finger electrodes, opposite to which first substrate electrodes fixedly connected to the substrate are situated, the first finger electrodes and substrate electrodes allowing a deflection of the second mass element in the first direction to be detected.

In another preferred specific embodiment, the third mass element has second finger electrodes, opposite to which second substrate electrodes fixedly connected to the substrate are situated, the second finger electrodes and substrate electrodes allowing a deflection of the third mass element in the second direction to be detected.

DETAILED DESCRIPTION

Figure 1:
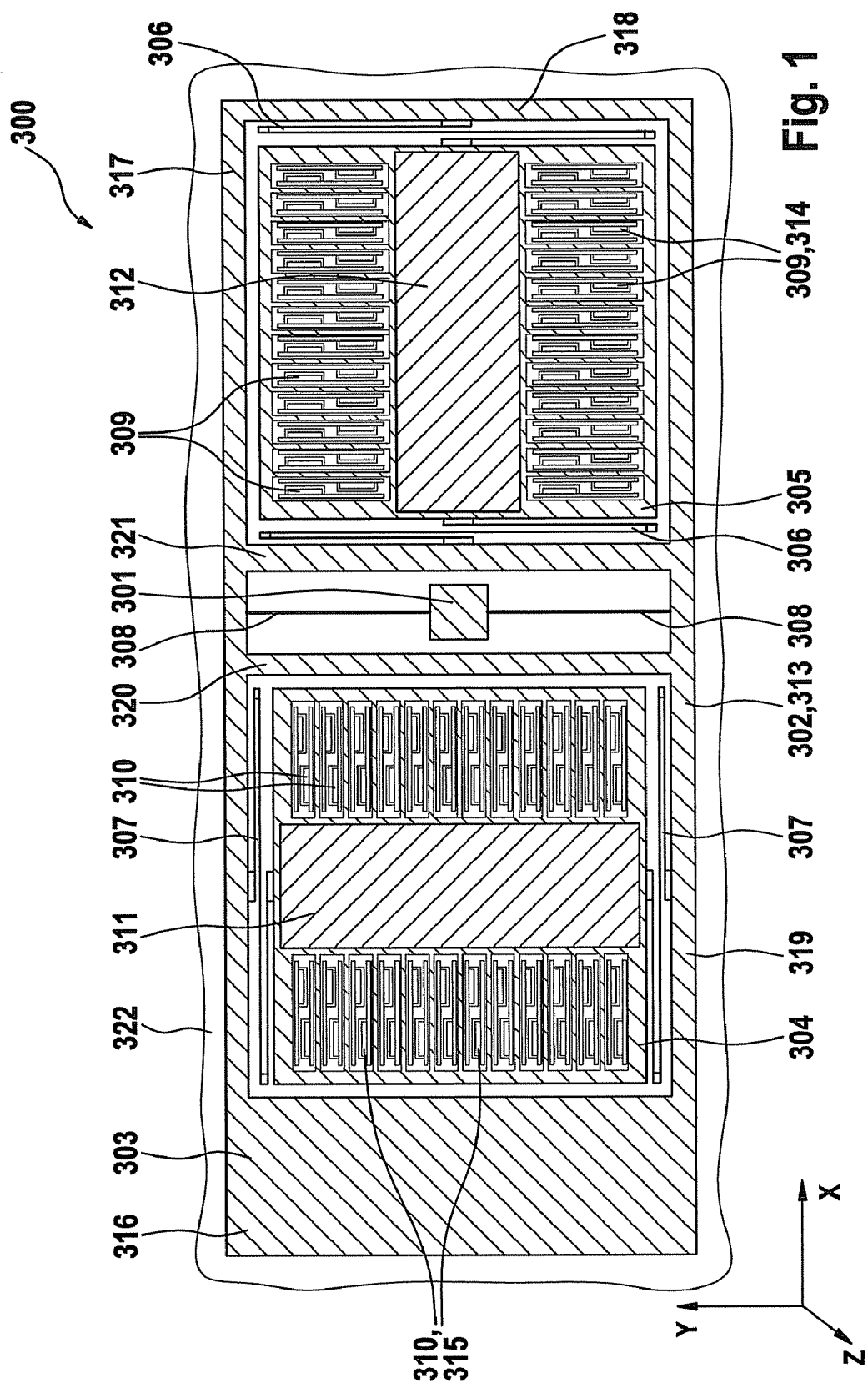
FIG. 1 shows a first specific embodiment of a triaxial acceleration sensor.

FIG. 1 shows a schematic representation of a first specific embodiment of an acceleration sensor 300, which is situated in the z direction above a surface of a substrate 322, lying in the x-y plane. Acceleration sensor 300 is suitable for detecting accelerations in all three spatial directions x, y, z. Acceleration sensor 300 is manufactured, for example, from a silicon substrate, as a micromechanical component.

Acceleration sensor 300 includes an external frame 313, which is situated in the x-y plane. External frame 313 has a rectangular basic shape. The outer edges of external frame 313 are formed by a first frame part 316, a second frame part 317, a third frame part 318, and a fourth frame part 319. First frame part 316 and third frame part 318 are oriented parallel to the y axis. Second frame part 317 and fourth frame part 319 are oriented parallel to the x axis. The area enclosed by first, second, third, and fourth frame parts 316, 317, 318, 319 is subdivided into three sections, adjacent in the x direction, by a fifth frame part 320 and a sixth frame part 321, which are oriented parallel to the y axis. First frame part 316 is wider compared to third frame part 318 and forms an additional mass 303.

A fixing point 301, connected to the substrate, is situated in the central area section of the three area sections enclosed by external frame 313, which runs between fifth frame part 320, second frame part 317, sixth frame part 321, and fourth frame part 319. Fixing point 301 is connected to external frame 313 via two z springs 308 oriented in the y direction. z springs 308 are designed as torsion springs. A first z spring 308 connects fixing point 301 to second frame part 307. A second z spring 308 connects fixing point 301 to fourth frame part 319. z springs 308 form an axis of rotation oriented in the y direction, about which external frame 313 may be tilted.

The second area section enclosed by external frame 313 has an essentially rectangular shape and is situated between first frame part 316, second frame part 317, fifth frame part 320, and fourth frame part 319. A first internal frame 304, which represents a mass element and has an essentially rectangular basic shape, is situated within this area section. First internal frame 304 is connected to external frame 313 via two y springs 307. The edge of first internal frame 304, adjacent to second frame part 317 of external frame 313, is connected to second frame part 317 via first y spring 307. The edge of first internal frame 304 adjacent to fourth frame part 319 of external frame 313 is connected to fourth frame part 319 via second y spring 307. Both y springs 307 have a meandering or S shape. y springs 307 are designed to be elastic in the y direction, but rigid in the x and z directions.

The third area section enclosed by external frame 313 has an essentially rectangular shape and is delimited by sixth frame part 321, second frame part 317, third frame part 318, and fourth frame part 319. This area section is essentially filled by a second internal frame 305, which represents a mass element. Second internal frame 305 is connected to external frame 313 via two x springs 306. The external edge of second internal frame 305, adjacent to sixth frame part 321 of external frame 313, is connected to sixth frame part 321 via first x spring 306. The external edge of second internal frame 305, adjacent to third frame part 318 of external frame 313, is connected to third frame part 318 via second x spring 306. x springs 306 are designed as meandering or S-shaped bar springs and are elastic in the x direction, but rigid in the y and z directions.

First internal frame 304 is subdivided into three rectangular area sections adjacent to each other in the x direction. The central area section of first internal frame 304 has a flat design and is situated in the z direction above a first z electrode 311, fixedly connected to the substrate. First z electrode 311 has essentially the same dimension in the x and y directions as the central area section of first internal frame 304. The central area section of first internal frame 304 and first z electrode 311 form a capacitor, whose capacitance is a function of the distance between the central area section of first internal frame 304 and first z electrode 311.

The area elements of first internal frame 304 situated on both sides of the central area section of first internal frame 304 are designed as a grid having grid bars running in the x direction and forming a plurality of y electrode fingers 315. y electrode fingers 315 are situated in the z direction above y substrate electrodes 310, fixedly connected to the substrate. y electrode fingers 315 and y substrate electrodes 310 form a capacitor, whose capacitance is a function of the distance between y electrode fingers 315 and y substrate electrodes 310.

The area covered by second internal frame 305 is subdivided into three rectangular area sections having approximately the same size, adjacent to each other in the y direction. The central area section of second internal frame 305 has a flat design and is situated in the z direction above a second z electrode 312, fixedly connected to the substrate. Second z electrode 312 has essentially the same dimension in the x and y directions as the central area section of second internal frame 305. The central area section of second internal frame 305 and second z electrode 312 form a capacitor, whose capacitance is a function of the distance between the central area section of second internal frame 305 and second z electrode 312.

The area sections of second internal frame 305, situated on both sides of the central area section of second internal frame 305, are designed as a grid having grid bars running in the y direction and forming a plurality of x electrode fingers 314. x electrode fingers 314 are situated in the z direction above x substrate electrodes 309, which are fixedly connected to the substrate. x electrode fingers 314 and x substrate electrodes 309 form capacitors, whose capacitance is a function of the distance between x electrode fingers 314 and x substrate electrodes 309.

External frame 313, y springs 307, first internal frame 304, x springs 306, and second internal frame 305 together form a rocker mass 302, or a mass element. Due to the additional mass 303 formed by first frame part 316 of external frame 313, rocker mass 302 has an asymmetric design with respect to the axis of rotation formed by z springs 308. On one side of the axis of rotation formed by z springs 308, rocker mass 302 has a mass which is greater than that on the other side of the axis of rotation by additional mass 303.

An acceleration acting on acceleration sensor 300 in the x direction exerts a force acting on second internal frame 305 in the x direction. It results in an elastic deformation of x springs 306 and in a deflection of second internal frame 305 relative to external frame 313. The distance between x electrode fingers 314 and x substrate electrodes 309 changes due to the deflection of second internal frame 305, which changes the capacitance of the capacitor formed thereby. This may be detected by an electronic evaluation system connected to acceleration sensor 300. The capacitance change represents a measure of the magnitude of the acceleration acting on acceleration sensor 300.

An acceleration acting in the x direction also generates forces acting on external frame 313 and first internal frame 304 in the x direction. However, since y springs 307 and z springs 308 have a rigid design in the x direction, these forces do not cause external frame 313 or first internal frame 304 to deflect.

An acceleration acting on acceleration sensor 300 in the y direction results in a force acting on first internal frame 304 in the y direction and deflects it by an elastic deformation of y springs 307 against external frame 313. The distance thus changed between y electrode fingers 315 and y substrate electrodes 310 changes the capacitance of the capacitor formed thereby, which may be detected and quantified by an electronic evaluation system connected to acceleration sensor 300. The capacitance change is a measure of the magnitude of the acceleration acting in the y direction. Since x springs 306 and z springs 308 are not deformable in the y direction, second internal frame 305 and external frame 313 are not deflected.

An acceleration acting on acceleration sensor 300 in the z direction generates a force acting on rocker mass 302 in the z direction, which, due to additional mass 303 on one side of the axis of rotation formed by z springs 308, results in a torque acting on rocker mass 302 and in a tilt of rocker mass 302 about the axis of rotation formed by z springs 308. The greater the acceleration acting on rocker mass 302, the greater the tilt angle. Due to the tilting of rocker mass 302, the distances between first internal frame 304 and first z electrode 311, and between second internal frame 305 and second z electrode 312, are changed. Depending on the direction of tilt of rocker mass 302, one of the distances increases, while the other one decreases. This changes the capacitances of the capacitors formed by first internal frame 304 and first z electrode 311, or second internal frame 305 and second z electrode 312. This is detected with the aid of an electronic evaluation system. The changes in opposite directions of the two capacitances allow a differential evaluation of the capacitance changes, which provides a linearized relationship between output signal and input acceleration.

Since y springs 307 and x springs 306 are not deformable in the z direction, first internal frame 304 and second internal frame 305 are not deflected with respect to external frame 313.

Figure 2:
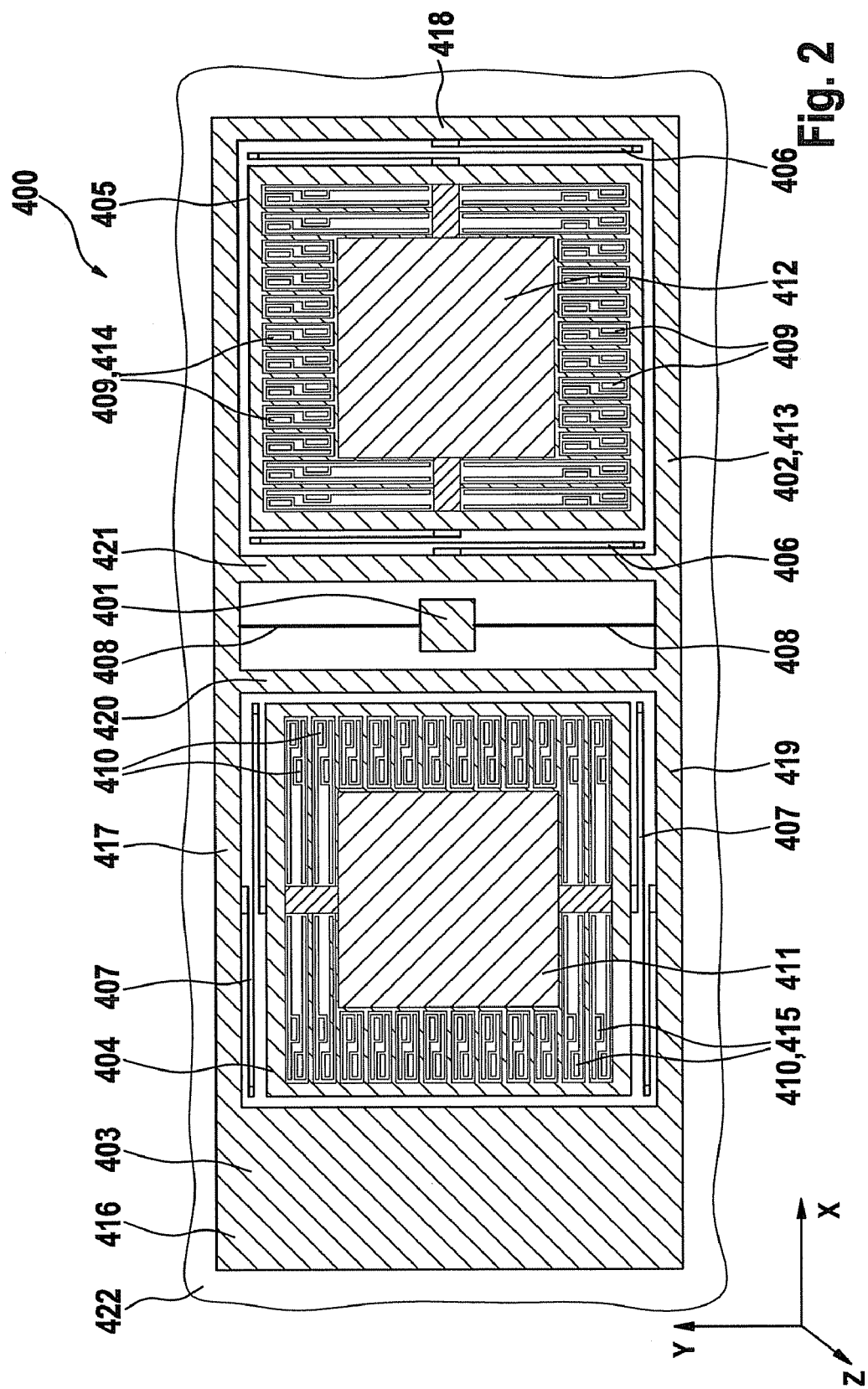
FIG. 2 shows a second specific embodiment of a triaxial acceleration sensor.

FIG. 2 shows a second specific embodiment of the present invention based on an acceleration sensor 400. Acceleration sensor 400 is situated in a z direction above a substrate 422, situated in an x-y plane. Substrate 422 may be a silicon substrate, for example. Acceleration sensor 400 may be manufactured, for example, using semiconductor microstructuring methods.

Acceleration sensor 400 has an external frame 413 having a first frame part 416, a second frame part 417, a third frame part 418, and a fourth frame part 419, which are situated as lateral edges of a rectangle. First frame part 416 and third frame part 418 are oriented parallel to the y axis. Second frame part 417 and fourth frame part 419 are oriented parallel to the x axis. First frame part 416 is designed to be wider than third frame part 418 and thus represents an additional mass 403.

The area enclosed by external frame 413 is subdivided into three area sections adjacent in the x direction by a fifth frame part 420 and a sixth frame part 421, which run parallel to the y axis and are situated between second frame part 417 and fourth frame part 419. A fixing point 401, fixedly connected to the substrate, is situated in the central area section delimited by fifth frame part 420, second frame part 417, sixth frame part 421, and fourth frame part 419. External frame 413 is connected to fixing point 401 via two z springs 408 oriented in the y direction. First z spring 408 extends from fixing point 401 to second frame part 413. Second z spring 408 extends from fixing point 401 to fourth frame part 419. z springs 408 are designed as bar-shaped torsion springs and form an axis of rotation which is parallel to the y axis, and about which external frame 413 may be tilted against the substrate situated in the x-y plane.

The area section enclosed by first frame part 416, second frame part 417, fifth frame part 420, and fourth frame part 419 is essentially filled by a rectangular first internal frame 404, which represents a mass element. A lateral edge of first internal frame 404, parallel to second frame part 417, is connected to second frame part 417 via a first y spring 407. The lateral edge of first internal frame 404 adjacent to fourth frame part 419 is connected to fourth frame part 419 via a second y spring 407. y springs 407 are elastically deformable in the y direction, but are rigid in the x and z directions. y springs 407 are designed as meandering or S-shaped bar springs. y springs 407 allow first internal frame 404 to deflect against external frame 413.

The area section delimited by sixth frame part 421, second frame part 417, third frame part 418, and fourth frame part 419 is essentially filled by a second internal frame 405, which represents a mass element and has a basic rectangular shape. The external edge of second internal frame 405, adjacent to sixth frame part 421, is connected to sixth frame part 421 via a first x spring 406. The external edge of second internal frame 405, adjacent to third frame part 418, is connected to third frame part 418 via a second x spring 406. x springs 406 are designed as meandering or S-shaped bar springs and are elastically deformable in the x direction, but are rigid in the y and z directions. x springs 406 allow second internal frame 405 to deflect against external frame 413.

First internal frame 404 has a central rectangular area which has a flat design and is situated in the z direction above a first z electrode 411, fixedly connected to the substrate. The flat area of first internal frame 404 and first z electrode 411 together form a capacitor, whose capacitance is a function of the distance between first internal frame 404 and first z electrode 411. The area of first internal frame 404 surrounding the central area of first internal frame 404 is formed by two grid sections which are adjacent in the x direction. The grid sections of first internal frame 404 have grid bars oriented in the x direction and forming y electrode fingers 415, which are situated in the z direction above a plurality of y substrate electrodes 410, fixedly connected to the substrate. y electrode fingers 415, oriented in the x direction, extend from the edge of frame 404 to the central, flat area of first internal frame 404, i.e., to a bar of frame 404, separating the two grid sections. y electrode fingers 415, adjacent to the central, flat area of first internal frame 404, are thus shorter than the two y electrode fingers 415, adjacent to the bar of frame 404 separating the two grid sections. y electrode fingers 415 and y substrate electrodes 410 form capacitors, whose capacitances are a function of the distance between y electrode fingers 415 and y substrate electrodes 410.

Second internal frame 405 has a central, flat, rectangular section which is situated in the z direction above a z electrode 412, fixedly connected to the substrate. The flat section of second internal frame 405 and second z electrode 412 form a capacitor, whose capacitance is a function of the distance between the flat section of second internal frame 405 and second z electrode 412. The flat section of second internal frame 405 is enclosed by two grid sections of second internal frame 405, which are adjacent in the y direction and have a plurality of grid bars oriented in the y direction, forming a plurality of x electrode fingers 414. x electrode fingers 414, oriented in the y direction, extend from the edge of frame 405 to the central, flat area of second internal frame 405, i.e., to a bar of frame 405, separating the two grid sections. x electrode fingers 414, which are adjacent to the central, flat area of second internal frame 405, are thus shorter than x electrode fingers 414, adjacent to the bar of frame 405, separating the two grid sections. x electrode fingers 414 are situated in the z direction above a plurality of x substrate electrodes 409, fixedly connected to the substrate and, together with these, form capacitors, whose capacitance is a function of the distance between x electrode fingers 414 and x substrate electrodes 409.

External frame 413, y springs 407, first internal frame 404, x springs 406 and second internal frame 405 together form a rocker mass 402, or a mass element. Rocker mass 402 is asymmetrical with respect to the axis formed by z springs 408. The part of rocker mass 402 enclosing first frame part 416 has additional mass 403 with respect to the other part of rocker mass 402.

An acceleration acting on acceleration sensor 400 in the x direction results in a force acting on second internal frame 405 in the x direction and deflects it against external frame 413 while x springs 406 are elastically deformed. This changes the distance between x electrode fingers 414 and x substrate electrodes 409, which changes the capacitance of the capacitors formed thereby. The greater the acceleration acting on acceleration sensor 400, the greater the deflection and thus the capacitance changes. The capacitance changes may be detected with the aid of an electronic evaluation system. y springs 407 and z springs 408 are rigid in the x direction; therefore, an acceleration acting in the x direction does not cause external frame 413 or first internal frame 404 to deflect.

An acceleration acting on acceleration sensor 400 in the y direction results in a force acting on first internal frame 404 in the y direction and deflects it against external frame 413 while y springs 407 are elastically deformed. This changes the distance between y electrode fingers 415 and y substrate electrodes 410, which results in a capacitance change of the capacitors formed by y electrode fingers 415 and y substrate electrodes 410, which may be detected by an electronic evaluation system. The greater the deflection and thus the capacitance changes are, the greater the acceleration acting on the acceleration sensor. x springs 406 and z springs 408 are rigid in the y direction; therefore, there is no deflection of second internal frame 405 or of external frame 413.

An acceleration acting on acceleration sensor 400 in the z direction generates a force acting on rocker mass 402 in the z direction and, due to additional mass 403, in a torque causing rocker mass 402 to tilt about the axis of rotation formed by z springs 408. The greater the force acting on acceleration sensor 400, the greater the angle of tilt. Due to the tilting of rocker mass 402, the distances between first internal frame 404 and first z electrode 411, and between second internal frame 405 and second z electrode 412 are changed, which results in a capacitance change, detectable by an electronic evaluation system, of the capacitors formed by first internal frame 404 and first z electrode 411, and second internal frame 405 and second z electrode 412. Since the capacitance changes have opposite signs, a differential evaluation is possible, thereby suppressing the zero deviations. Because x springs 406 and y springs 407 are rigid in the z direction, no deflection of first internal frame 404 or of second internal frame 405 occurs against external frame 413.

Acceleration sensor 400 shown in FIG. 2 has the advantage over acceleration sensor 300 shown in FIG. 1 that the flat central sections of first internal frame 404 and of second internal frame 405, and first z electrode 411 and second z electrode 412 are symmetrical with respect to each other, which offers advantages regarding linearity and offset stability. On the other hand, in acceleration sensor 300, the surface area of first internal frame 304 and second internal frame 305 is made better use of, which increases the basic capacitance and thus the sensitivity of the capacitors provided for detecting z accelerations.

x substrate electrodes 309 and 409 and y substrate electrodes 310 and 410 of acceleration sensors 300, 400 shown in FIGS. 1 and 2 may also be optionally designed in such a way that deflections of first internal frames 304, 404 and second internal frames 305, 405 caused by accelerations result in capacitance changes, which may be evaluated differentially. The technical details are known to those skilled in the art from the related art.

What is claimed is:

1. An acceleration sensor comprising:
a substrate;
a first mass element structured as an external frame enclosing at least three area sections, the external frame connected to the substrate in a centrally located first of the at least three area sections in such a way that the external frame is rotatable about an axis;
a second mass element situated in a second of the at least three area sections and connected to the second area section of the external frame in such a way that the second mass element is movable along a first direction parallel to the axis; and
a third mass element situated in a third of the at least tree area sections and connected to the third area section of the external frame in such a way that the third mass element is movable along a second direction perpendicular to the axis.

2. The acceleration sensor according to claim 1, wherein the first mass element is designed asymmetrically with respect to the axis.

3. The acceleration sensor according to claim 1, wherein the substrate is a silicon substrate.

4. The acceleration sensor according to claim 1, further comprising at least one detection electrode fixedly connected to the substrate and situated opposite the first mass element, which allows detection of a rotation of the first mass element about the axis.

5. The acceleration sensor according to claim 4, wherein at least two detection electrodes are provided, the detection electrodes allowing a differential evaluation of a rotation of the first mass element about the axis.

6. The acceleration sensor according to claim 5, wherein the at least two detection electrodes are situated on each of two sides of the axis, the at least two detection electrodes being symmetrical to each other with respect to the axis.

7. The acceleration sensor according to claim 1, wherein the first mass element has a frame, the second mass element being connected to the frame via at least one bending spring extensible in the first direction.

8. The acceleration sensor according to claim 1, wherein the first mass element has a frame, the third mass element being connected to the frame via at least one bending spring extensible in the second direction.

9. The acceleration sensor according to claim 1, wherein the second mass element has first finger electrodes, with first substrate electrodes fixedly connected to the substrate being situated opposite thereto, the first finger electrodes and the first substrate electrodes allowing a detection of a deflection of the second mass element in the first direction.

10. The acceleration sensor according to claim 1, wherein the third mass element has second finger electrodes, with second substrate electrodes fixedly connected to the substrate being situated opposite thereto, the second finger electrodes and the second substrate electrodes allowing a detection of a deflection of the third mass element in the second direction.

* * * * *